United States Patent [19]

Cuscurida et al.

[11] Patent Number: 4,683,272
[45] Date of Patent: Jul. 28, 1987

[54] POLYMER POLYOLS DERIVED FROM NOVEL DISPERSING MEDIA

[75] Inventors: Michael Cuscurida; George P. Speranza, both of Austin, Tex.

[73] Assignee: Texaco Inc., White Plains, N.Y.

[21] Appl. No.: 780,155

[22] Filed: Sep. 26, 1985

[51] Int. Cl.$^4$ .................. C08G 65/32; C08G 18/14; C08G 18/67; C08L 71/02

[52] U.S. Cl. .................. 525/404; 521/137; 528/75; 528/412

[58] Field of Search .................. 525/404; 521/137; 528/75, 412

[56]     References Cited
       U.S. PATENT DOCUMENTS

| | | | |
|---|---|---|---|
| 3,448,172 | 6/1969 | Damusis et al. | 525/28 |
| 3,585,185 | 6/1971 | Levis et al. | 524/70 |
| 3,585,189 | 6/1971 | Verheyden et al. | 536/24 |
| 3,654,370 | 4/1972 | Yeakey | 564/480 |
| 3,823,201 | 7/1974 | Pizzini et al. | 524/762 |
| 4,122,056 | 10/1978 | Ramlow et al. | 521/137 |
| 4,286,074 | 8/1981 | Davis et al. | 528/392 |
| 4,293,470 | 10/1981 | Cuscurida | 528/49 |
| 4,296,213 | 10/1981 | Cuscurida et al. | 521/166 |
| 4,316,991 | 2/1982 | Speranza et al. | 521/174 |
| 4,321,342 | 3/1982 | Davis et al. | 525/530 |
| 4,435,527 | 3/1984 | Cuscurida et al. | 521/173 |
| 4,454,255 | 6/1984 | Ramlow et al. | 521/137 |
| 4,458,038 | 7/1984 | Ramlow et al. | 521/137 |
| 4,469,862 | 9/1984 | Komai et al. | 528/271 |
| 4,518,778 | 5/1985 | Cuscurida | 544/398 |
| 4,521,581 | 6/1985 | Dominguez et al. | 528/57 |
| 4,523,025 | 6/1985 | Cuscurida et al. | 560/26 |
| 4,525,488 | 6/1985 | Cuscurida et al. | 521/164 |
| 4,539,339 | 9/1985 | Cuscurida et al. | 521/137 |
| 4,539,378 | 9/1985 | Cuscurida et al. | 525/407 |

Primary Examiner—John Kight
Assistant Examiner—M. L. Moore
Attorney, Agent, or Firm—Jack H. Park; Kenneth R. Priem; Richard A. Morgan

[57]     ABSTRACT

A vinyl polymer polyol is prepared by the free radical initiated polymerization of vinyl monomers in a dispersing media comprising a polyether polyol and a salt formed by reacting a polyoxyalkylene polyamine with an acid containing a polymerizable double bond.

15 Claims, No Drawings

POLYMER POLYOLS DERIVED FROM NOVEL DISPERSING MEDIA

BACKGROUND OF THE INVENTION

1. Field of the Invention

This invention relates to dispersions of polymers made from various vinyl monomers in a dispersing media.

2. Description of the Related Art

It is known that stable dispersions of polymers in polyols are useful in the preparation of polyurethanes. U.S. Pat. No. 4,293,470 discloses a stable polyurea polymer polyol, useful in the manufacture of flexible polyurethane foams, which is made by the reaction of a hydroxyl-containing amine with a 3,000 to 8,000 molecular weight polyether polyol and an organic polyisocyanate followed by quenching with a secondary amine. U.S. Pat. No. 4,296,213 teaches that a polyurea polymer polyol may also be prepared by the reaction of a hydroxyl-containing amine, a polyether polyol and an organic polyisocyanate.

The preparation of polyester polymer polyols by the reaction of a polyester polycarbonate, a polyether polyol and an organic polyisocyanate is described in U.S. Pat. No. 4,435,527.

U.S. Pat. No. 4,518,778 discloses a polymer polyol made by the reaction of an alkylene oxide adduct of a hydroxyl-containing amine, a 3,000 to 8,000 molecular weight polyether polyol and an organic polyisocyanate. U.S. Pat. No. 4,523,025 instructs that a polymer polyol may be made by the reaction of a partially reacted polyamine with an organic polyisocyanate in a polyether solvent.

U.S. Pat. No. 4,525,488 teaches that a stable dispersion of polyurethane polymer polyols may be made by reacting a Mannich condensate with an organic polyisocyanate in a polyether polyol. The preparation of vinyl polymer polyols by the in situ free polymerization of vinyl monomers in an epoxy resin-modified polyol is described in U.S. Pat. No. 4,539,378. A process for preparing polyurethanes employing this polyol is taught in U.S. Pat. No. 4,539,339.

U.S. Pat. No. 4,521,581 discloses a method of making polymer polyols by mixing a relatively low molecular weight liquid polymer of an ethylenically unsaturated monomer with a polyol and cross-linking the polymer in the polyol.

In order to provide flexible polyurethanes with low shrinking properties, U.S. Pat. No. 3,448,172 discloses modification with vinyl monomers of a flexibilized polyester resin composition consisting of an unsaturated polyester resin and a urethane polymer having an ordered arrangement of pendant unsaturation. The urethane polymer component is prepared either by reacting an isocyanate-terminated adduct with a chain extending agent consisting of a difunctional hydroxyl-, carboxyl-, amino- or mercapto-terminated polyether, polyester or polyurethane or by reacting a hydroxy-terminated partially esterified adduct, which is the reaction product of a polyether polyol and an unsaturated monocarboxylic acid, with a chain extending agent consisting of an isocyanate-terminated polyether, polyester or polyurethane.

U.S. Pat. No. 3,585,185 to Levis, et al. teaches containing polyol, employed in the preparation of polyurethane foams to improve flame retardant properties, may be prepared by reacting alkylene oxide condensates of organic compounds having at least two active hydrogen atoms with a halogen-containing organic acid anhydride and an alkylene oxide.

The preparation of highly stabe graft copolymer dispersions by the in situ polymerization of a vinyl monomer in the presence of a free radical catalyst in a polyol containing 0.10–0.70 moles of unsaturation per mole of polyol is taught in U.S. Pat. No. 3,823,201. The unsaturated polyol mixture comprises a polyol which may be prepared by the reaction of an alkylene oxide with the reaction product of maleic anhydride and a polyether polyol having an equivalent weight of from 250 to 5,000.

U.S. Pat. No. 4,122,056 to Ramlow, et al. reveals an aqueous emulsion of hydroxy-containing polymeric solids prepared by polymerizing in the presence of a free radical catalyst a major amount of a vinyl monomer and a minor amount of certain hydroxyl-terminated organic compounds containing a polymerizable carbon-to-carbon double bond. The hydroxyl-terminated organic compounds may be prepared by the reaction of an organic compound having from one to eight hydroxyl groups with an organic compound having both ethylenic unsaturation and a hydroxyl, carboxyl, anhydride or epoxy group. The products of this process were found useful in the preparation of polyurethane foams having improved tear and tensile strength and load-bearing properties.

U.S. Pat. Nos. 4,454,255 and 4,458,038, both to Ramlow, et al., instruct that a graft polymer dispersion, useful in the production of stable polyurethane foams with flame retardant properties, may be prepared by polymerizing in the presence of a free radical initiator an ethylenically unsaturated monomer in a polyol mixture comprising a polyoxyalkylene polyether polyol and a macromer containing unsaturation consisting of the reaction product of a polyoxyalkylene polyether polyol with maleic acid, maleic anhydride or fumaric acid.

SUMMARY OF THE INVENTION

This invention is a vinyl polymer polyol prepared by polymerizing via a free radical initiated reaction a monomer component comprising at least one vinyl monomer in the presence of a dispersing media comprising a polyether polyol and a salt formed by reacting polyoxyalkylene polyamines with acids containing a polymerizable double bond.

DESCRIPTION OF THE PREFERRED EMBODIMENTS

By utilizing a dispersing media consisting of a polyether polyol and a salt formed by reacting polyoxyalkylene polyamines with acids containing a polymerizable double bond, the vinyl polymer polyols of this invention result in stable polyurethane foams with improved load-bearing properties. Most significant, it requires less of the polymer polyol of this invention than prior art polymer polyols (up to 50% less) to prepare stable polyurethane foams.

The Reactants

The monomers useful in the process of this invention are the polymerizable monomers characterized by the presence therein of at least one polymerizable ethylenically unsaturated group of the type

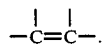

The monomers can be used singly or in combination to produce homopolymer/reactive solvent products or copolymer/reactive solvent combinations, respectively.

Preferably, the monomers contain the double bond in a vinyl group. These monomers are well known in the art and include the hydrocarbon monomers such as styrene, butadiene, isoprene, 1,4-pentadiene, 1,6-hexadiene, 1,7-octadiene, α-methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethyl styrene, iodostyrene, cyanostyrene, nitrostyrene, N,N-dimethylaminostyrene, acetoxystyrene, methyl 4-vinylbenzoate, phenoxystyrene p-vinyldiphenyl sulfide, p-vinylphenyl oxide, and the like. Also suitable are acrylic and substituted acrylic monomers such as acrylic acid, methacrylic acid, acrylonitrile, methyl methacrylate, methyl acrylate, 2-hydroxyethyl acrylate, 2-hydroxyethyl methacrylate, cyclohexylmethacrylate, benzyl methacrylate, isopropyl methacrylate, octyl methacrylate, methacrylonitrile, methyl alpha-chloroacrylate, ethyl alpha-ethoxy acrylate, methyl alpha-acetaminoacrylate, butyl acrylate, 2-ethylhexyl aorylate, phenyl acrylate, phenyl methacrylate, α-chloroacrylonitrile, N,N-dimethylacrylamide, N,N-dibenzylacrylamide, N-butylacrylamide, methacrylyl formamide, and the like. The vinyl esters, vinyl ethers, vinyl ketones, etc. are also useful, such as vinyl acetate, vinyl choroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinyldiene bromide, 1-chloro-1-fluoroethylene, vinyldiene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran,2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyacetamide, N-vinylpyrrolidone, vinyl imidazole, divinyl sulfide, divinyl sulfone, sodium vinyl sulfoxide, methyl vinyl sulfonate, N-vinyl pyrrole and the like. Other compounds expected to be useful are dimethyl fumarate, dimethyl maleate, maleic acid, crotonic acid, fumaric acid, itaconic acid, monomethyl itaconate, t-butyl aminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

Vinyl monomers are preferred, and styrene, acrylonitrile, methyl methacrylate, methyl acrylate and butadiene are particularly preferred. It is especially preferred that styrene and acrylonitrile be used together. The preferred weight ratio of styrene to acrylonitrile ranges from 9:1 to 1:9. Any of the known chain transfer agents can be present, if desired.

Polymerizing the monomers in the dispersing media occurs in the presence of a catalytically effective amount, preferably 0.1 to 5.0 wt. % based on total feed, of a conventional free radical catalyst known to be suitable for the polymerization of ethylenically unsaturated monomers. Preferred catalysts are the azo-bis compounds such as 2,2'-azobis-(2,4-dimethylvaleronitrile), 2,2'-azobis-(isobutyronitrile), 2,2'-azobis-(2-methylbutyronitrile) and 1,1'-azobis-(cyanocyclohexane) and the like. Other preferred catalysts are organic peroxides, peroxydicarbonates and peroxyesters. Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl) peroxide, p-monomethoxybenzoyl peroxide, rubrene peroxide, ascaridole, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, persuccinic acid, diisopropyl peroxy dicarbonate, and the like. A mixture of catalysts may also be used.

Especially preferred are polymerization catalysts manufactured by the E. I. duPont de Nemours and Co. such as 2,2'-azobis-(2,4-dimethylvaleronitrile), 2,2'-azobis-(isobutyronitrile), 2,2'-azobis-(2-methylbutyronitrile) and 1,1'-azobis-(cyanocyclohexane). These products are commercially sold as VAZO ® 52, 64, 67, and 88, respectively.

The polymerization occurs in a dispersing media consisting of a polyether polyol and the salt of a polyoxyalkylene polyamine. The polyether polyols useful in preparing the polymer polyol compositions of this invention include polyols having a functionality of from two to about six and having a molecular weight of from about 2,000 to 10,000, preferably from about 2,000 to 7,000. These polyether polyols are prepared by a well known process which involves the reaction of a polyhydric initiator such as trimethylolpropane, glycerol, 1,2,6-hexanetriol, sorbitol, pentaerythritol, and the like, with an alkylene oxide such as ethylene oxide, propylene oxide and butylene oxide, or mixtures of ethylene oxide with propylene oxide and/or butylene oxide. This reaction is carried out with an alkoxylation catalyst, generally an alkali metal hydroxide such as potassium hydroxide. The alkoxylation reaction is continued until the product attains the desired molecular weight.

Though it is especially preferred that the polyether polyols are polyether triols, other useful polyether polyols include polyether diols. Preferred polyether diols are, for example, polypropylene glycols or mixed polypropylene glycol/polyethylene glycol co-polymers having a molecular weight from about 2,000 to about 5,000. These materials are produced by reacting ethylene oxide, propylene oxide, or butylene oxide, either sequentially or in admixture with an initiator such as, for example, ethylene glycol, propylene glycol or butylene glycol.

Other preferred polyols are those made by incorporating an epoxy resin internally in the polyol. These polyols are described, for example, in U.S. Pat. No. 4,316,991.

It is also preferred that the salt component of the dispersing media be the salt of a polyoxyalkylene polyamine having a molecular weight of from 200 to 5,000. The polyoxyalkylene polyamine may be made by treating the corresponding polyoxyalkylene polyols with ammonia and hydrogen over a catalyst prepared by the reduction of a mixture of the oxides of nickel, copper and chromium. For more details on the preparation of the polyoxyalkyleneamines used herein, see U.S. Pat. No. 3,654,370, incorporated by reference herein.

The salt may be formed by reacting the polyoxyalkylene polyamine with an acid containing a polymerizable double bond. It is preferred that the acid is reacted with the polyoxyalkylene polyamine in an acid to polyoxyalkylene polyamine ratio of from about 0.5:1 to about 1:1, and is selected from the group consisting of acrylic, methacrylic, itatonic and maleic acids.

The Reaction Conditions

To obtain the vinyl polymer polyols of this invention, all or a portion of the dispersing media is preferably added first to the reaction vessel. It is usually best that the material be heated to the reaction temperature before the next step, which is the slow or dropwise addition of a mixture of the vinyl monomer component (which may be more than one kind of vinyl monomer), the free radical initiator and the remainder of the dispersing media. After the reaction proceeds for a short time (0.25 to 1.0 hour), the reaction mixture is digested for approximately 15 minutes and volatiles are stripped off by conventional techniques to leave the vinyl polymer polyol product.

The reaction temperature should be about 75° to 150° C., preferably 90° to 140° C. Reaction pressures may range from atmospheric pressure to about 100 psig. When mixed vinyl monomers are used, such as styrene and acrylonitrile, the weight ratios should range from about 9:1 to 1:9, or preferably 30:70 to 70:30. The amount of polymer in the dispersing media, known as polymer loading, may range from 5 to about 50 wt. %, preferably from about 10 to 40 wt. %.

The preparation of the vinyl polymer polyols will be further illustrated by the following non-limiting examples. The use of the vinyl polymer polyols of this invention in flexible, high resilience polyurethane foams will also be demonstrated. The advantages over foams made from conventional polymer polyols will also be shown.

EXAMPLE 1

Salts of a 5,000 molecular weight polyoxypropylenetriamine (JEFFAMINE® T-5000 manufactured by Texaco Chemical Co. ), which contained 0.54 meg/g amine and acrylic acid were prepared by mixing the reactants in the following ratios:

| Salt | A | B |
|---|---|---|
| Charge, pbw | | |
| JEFFAMINE T-5000 | 1855 | 1855 |
| Acrylic acid | 72.06 | 36.03 |
| Eq. —COOH/—NH$_2$ | 1/1 | 0.5/1 |
| Properties | | |

| Salt | A | B |
|---|---|---|
| Viscosity, 77° F., cps | 35600 | 7140 |

EXAMPLE 2

Into a 2-liter, four-necked flask equipped with a stirrer, thermometer, water condenser, dropping funnel and nitrogen source were charged 700 g of a 5,000 molecular weight high reactivity, capped triol (THANOL® SF-5505 manufactured by Texaco Chemical Co.) and 100 g of Salt A of Example 1. The materials were then heated to 120° C.

A mixture of 85.4 g of styrene, 107.8 g of acrylonitrile, 10 g of VAZO® 67 polymerization initiator (2,2'-azobis-(2-methylbutyronitrile) manufactured by E. I. duPont de Nemours and Co.) and 2.0 g of dodecanethiol was then made up (Stream 2) and charged to the dropping funnel. Stream 2 was then slowly added to the reaction flask maintaining the temperature at 120° C. The reaction mixture was then digested for 15 minutes. After digestion, the reaction mixture was stripped under vacuum to a minimum pressure at 120° C. The recovered volatiles (12.1 g) indicated a monomer conversion of 93.4%. The finished product was a light yellow, viscous, creamy dispersion which contained few, if any, solids.

EXAMPLE 3

This example will illustrate the preparation of the polymer polyols of this inention using Salt B of Example 1. The reaction vessel described in Example 2 was used in these experiments.

| Charges | A | B |
|---|---|---|
| Reactor Charge | | |
| THANOL® SF-5505, g | 600 | 500 |
| VAZO® 67, g | 1.0 | — |
| Salt B (Example 1), g | 100 | 200 |
| Stream 2 Charge | | |
| THANOL SF-5505, g | 100 | 100 |
| VAZO 67, g | 4.0 | 5.0 |
| Styrene, g | 90 | 90 |
| Acrylonitrile, g | 110 | 110 |
| Dodecanethiol, g | 2.0 | 2.0 |
| Reaction Details | | |
| Temperature, °C. | 90 | 90–98 |
| Monomer addition time, hr | 2.5 | 2.75 |
| Digestion time, hr | 0.25 | 1.0 |
| Monomer conversion, % | 94.9 | 95.4 |
| Properties | | |
| Hydroxyl no., mg KOH/g | 25.5 | 25.8 |
| Viscosity, 77° F., cps | 2530 | 6060 |
| Appearance | Light yellow dispersion | |
| Water, wt. % | 0.2 | 0.2 |

EXAMPLE 4

(Comparative)

This example will illustrate the preparation of an amide by reaction of JEFFAMINE® T-5000 and acrylic acid. Into a 1-liter, three-necked flask was charged 400 g of JEFFAMINE T-5000 and 7.7 g acrylic acid. The flask was equipped with a stirrer, thermometer, water condenser, Dean-Starke trap and a nitrogen source. The reaction mixture was then heated to 150° C. and then gradually to 190° C. Finally, the reaction mixture was heated at 190°–200° C. for 1.25 hours. The finished product was a yellow, viscous liquid which had the following properties:

| Properties | | |
|---|---|---|
| Total acetylatables, meq/g | | 0.456 |
| Water, wt. % | | 0.05 |
| Viscosity, cs | 77° F. | 10895 |
| | 100° F. | 5023 |

The infrared spectra of the product show the presence of the amide group at 1540 cm$^{-1}$.

Using the procedure of Example 3, a polymer polyol was prepared from the amide of JEFFAMINE T-5000 and acrylic acid.

| | A |
|---|---|
| Reactor Charge | |
| THANOL ® SF-5505, g | 600 |
| JEFFAMINE ® T-5000/acrylic acid amide | 100 |
| Stream 2 Charge | |
| THANOL SF-5505, g | 100 |
| VAZO ® 67, g | 10 |
| Styrene, g | 90 |
| Acrylonitrile | 110 |
| Dodecanethiol, g | 2.0 |
| Reaction Details | |
| Temperature, °C. | 120 |
| Monomer addition time, hr | 1.0 |
| Digestion time, hr | 0.5 |
| Monomer conversion, % | 94 |
| Properties | |
| Hydroxyl no., mg KOH/g | 27.8 |
| Water, wt. % | 0.02 |
| Viscosity, 77° F., cps | 5640 |
| Appearance | Yellow dispersion |

EXAMPLE 5

This example will show the use of the polymer polyol of Example 3 in the preparation of flexible polyurethane foams. It will further show the influence of this polymer polyol in preventing foam shrinkage and the good load-bearing properties of the resultant foam. Comparative data show that neither JEFFAMINE ® T-5000 nor the polymer polyol made from the amide (Example 4) will stabilize the foam. Formulations, details of preparation and foam properties are shown in the following table:

| Foam no. | A | B | C | D |
|---|---|---|---|---|
| Formulation, pbw | | | | |
| Polymer Polyol | 40 | — | — | — |
| Amide-derived polymer polyol | — | 40 | — | — |
| THANOL ® SF-5505 | 60 | 60 | 100 | 100 |
| JEFFAMINE ® T-5000 | — | — | — | 10 |
| Water | 3.5 | 3.5 | 3.5 | 3.5 |
| L-5309 silicone[1] | 1.5 | 1.5 | 1.5 | 1.5 |
| THANCAT ® TD-33[2] | 0.45 | 0.45 | 0.45 | 0.45 |
| NIAX ® A-1[3] | 0.08 | 0.08 | 0.08 | 0.08 |
| THANCAT DM-70[4] | 0.3 | 0.3 | 0.3 | 0.3 |
| UL-1[5] | 0.01 | 0.01 | 0.01 | 0.01 |
| 80:20 TDI/PAPI ® 27[6] | 43.5 | 43.5 | 43.5 | 43.5 |
| NCO/OH | 1.02 | 1.02 | 1.02 | 1.02 |
| Details of Preparation | | | | |
| Cream time, sec | 8 | 8 | 8 | 8 |
| Rise time, sec | 105 | 110 | 105 | 90 |
| Gel time, sec | 240 | 210 | 240 | 240 |
| Properties | | | | |
| Foam appearance | Good | Shrunk badly | Shrunk badly | Shrunk badly, large cells |

-continued

| Foam no. | A | B | C | D |
|---|---|---|---|---|
| Density, pcf | 2.13 | — | — | — |
| Chatillon gauge reading, 25%, indentation lb[7] | 4.5 | — | — | — |
| Air flow, sec/100 ml[8] | 3.4 | — | — | — |

[1]A product of Union Carbide Chemical Co.
[2]33% triethylenediamine in propylene glycol; a product of Texaco Chemical Co.
[3]70% bis(dimethylaminoethyl)ether in dipropylene glycol; a product of Union Carbide Chemical Co.
[4]70% dimethylpiperazine and 30% dimorpholinodiethyl ether; a product of Texaco Chemical Co.
[5]Organic tin compound; a product of Witco Chemical Co.
[6]2.7 functionality polymeric isocyanate; a product of The Upjohn Co.
[7]Manual Model LIC compression tester; John Chatillon and Sons, Inc.
[8]Gurley gauge

EXAMPLE 6

This example will illustrate the use of the polymer polyol of Example 2 in the preparation of flexible polyurethane foam. It will further show that less of this type polymer polyol will stabilize polyurethane foam and that the foams have excellent load-bearing properties.

| Foam no. | B | D | C |
|---|---|---|---|
| Formulation, pbw | | | |
| Polymer polyol of Example 2 | 10 | 20 | — |
| NIAX ® 34-28[1] | — | — | 40 |
| THANOL SF-5505 | 90 | 80 | 60 |
| Water | 3.5 | 3.5 | 3.5 |
| L-5309 silicone | 1.5 | 1.5 | 1.5 |
| THANCAT TD-33 | 0.45 | 0.45 | 0.45 |
| NIAX A-1 | 0.08 | 0.08 | 0.08 |
| THANCAT DM-70 | 0.3 | 0.3 | 0.3 |
| UL-1 | 0.01 | 0.01 | 0.01 |
| 80:20 TDI/PAPI 27 | 43.5 | 43.5 | 43.5 |
| Details of Preparation | | | |
| Cream time, sec | 8 | 8 | 8 |
| Rise time, sec | 105 | 110 | 110 |
| Gel time, sec | 225 | 345 | 225 |
| Properties | | | |
| Foam appearance | Shrinkage | Good foam | Good foam |
| Density, pcf | — | 2.15 | 2.07 |
| Chatillon gauge reading, 25%, lb | — | 5.3 | 3.4 |
| Air flow, sec/100 ml | — | 21 | 36 |

[1]A 28 hydroxyl no. polymer polyol made by Union Carbide Corp. using a 5,000 molecular weight ethylene oxide-capped polyol as the dispersing media, and which contains approximately 20 wt. % polymerized acrylonitrile and styrene.

We claim:

1. A vinyl polymer polyol prepared by the process comprising polymerizing via a free radical initiated reaction a monomer component comprising at least one monomer in the presence of a dispersing media comprising a polyether polyol and a salt formed by reacting a polyoxyalkylene polyamine with an acid containing a polymerizable double bond.

2. The vinyl polymer polyol of claim 1 in which the polyoxyalkylene polyamine is reacted with an acid selected from the group consisting of acrylic, methacrylic, itatonic and maleic acids.

3. The vinyl polymer polyol of claim 1 in which the acid and polyoxyalkylene polyamine are reacted in an acid to polyoxyalkylene polyamine ratio of from about 0.5:1 to about 1:1.

4. The vinyl polymer polyol of claim 1 in which the monomer component is selected from the group consisting of styrene, acrylonitrile, methyl methacrylate, methyl acrylate, butadiene and mixtures thereof.

5. The vinyl polymer polyol of claim 1 in which the monomer component is a mixture of styrene and acrylonitrile in weight ratios of 9:1 to 1:9.

6. The vinyl polymer polyol of claim 1 in which the polymer loading of the dispersing media is in the range of about 5 to 50 wt. %.

7. The vinyl polymer polyol of claim 1 in which a free radical initiator is employed in a concentration of from 0.1 to 5.0 wt. % and which is selected from the group consisting of organic peroxides, peroxydicarbonates, peroxyesters, 2,2'-azobis-(2,4-dimethylvaleronitrile), 2,2'-azobis-(isobutyronitrile), 2,2'-azobis-(2-methylbutyronitrile), 1,1'-azobis-(cyanocyclohexane), and mixtures thereof.

8. The vinyl polymer polyol of claim 1 in which the reaction is conducted at a temperature in the range of 75° to 150° C. and at a pressure in the range of atmospheric to about 100 psig.

9. A vinyl polymer polyol prepared by the process comprising polymerizing via a free radical initiated reaction a vinyl monomer component selected from the group consisting of styrene, acrylonitrile, methyl methacrylate, methyl acrylate, butadiene and mixtures thereof, in the presence of a dispersing media comprising:
(a) a polyether polyol having a 2,000 to 7,000 molecular weight, and
(b) a salt formed by reacting a polyoxyalkylene polyamine having a 200 to 5,000 molecular weight and an acid selected from the group consisting of acrylic, methacrylic, itatonic and maleic acids
in which the polymer loading of the dispersing media is in the range of about 5 to 50 wt. %.

10. The vinyl polymer polyol of claim 9 in which the acid and polyoxyalkylene polyamine are reacted in an acid to polyoxyalkylene polyamine ratio of from about 0.5:1 to about 1:1.

11. The vinyl polymer polyol of claim 9 in which the vinyl monomer component is a mixture of styrene and acrylonitrile in weight ratios of 9:1 to 1:9.

12. The vinyl polymer polyol of claim 9 in which a free radical initiator is employed in a concentration of from 0.1 to 5.0 wt. % and which is selected from the group consisting of organic peroxides, peroxydicarbonates, peroxyesters, 2,2'-azobis-(2,4-dimethylvaleronitrile), 2,2'-azobis-(isobutyronitrile), 2,2'-azobis-(2-methylbutyronitrile), 1,1'-azobis-(cyanocyclohexane), and mixtures thereof.

13. The vinyl polymer polyol of claim 9 in which the reaction is conducted at a temperature in the range of 75° to 150° C. and at a pressure in the range of atmospheric to about 100 psig.

14. A vinyl polymer polyol prepared by the process comprising polymerizing via a free radical initiated reaction a vinyl monomer component consisting of styrene and acrylonitrile in a weight ratio ranging from 9:1 to 1:9, in the presence of a dispersing media comprising:
(a) a polyether polyol having a 2,000 to 7,000 molecular weight, and
(b) a salt formed by reacting a polyoxyalkylene polyamine having a 200 to 5,000 molecular weight and an acid selected from the group consisting of acrylic, methacrylic, itatonic and maleic acids in an acid to polyoxyalkylene polyamine ratio of about 0.5:1 to 1:1
at a temperature in the range of 75° to 150° C. and a pressure in the range of atmospheric to about 100 psig, to produce a vinyl polymer polyol with a polymer loading in the range of from 5 to 50 wt. %.

15. The vinyl polymer polyol of claim 14 in which a free radical initiator is employed in a concentration of from 0.1 to 5.0 wt. % and which is selected from the group consisting of organic peroxides, peroxydicarbonates, peroxyesters, 2,2'-azobis-(2,4-dimethylvaleronitrile), 2,2'-azobis-(isobutyronitrile), 2,2'-azobis-(2-methylbutyronitrile), 1,1'-azobis-(cyanocyclohexane), and mixtures thereof.

* * * * *